US012227928B2

(12) United States Patent
Tzeng

(10) Patent No.: US 12,227,928 B2
(45) Date of Patent: Feb. 18, 2025

(54) SENSOR FAUCET

(71) Applicant: Ncip Inc., Taipei (TW)

(72) Inventor: Rong-Chyan Tzeng, Taipei (TW)

(73) Assignee: NCIP INC., Taipei (TW)

( * ) Notice: Subject to any disclaimer, the term of this patent is extended or adjusted under 35 U.S.C. 154(b) by 429 days.

(21) Appl. No.: 17/579,956

(22) Filed: Jan. 20, 2022

(65) Prior Publication Data

US 2023/0228072 A1    Jul. 20, 2023

(51) Int. Cl.
*E03C 1/05*    (2006.01)
*G01S 13/04*    (2006.01)

(52) U.S. Cl.
CPC .............. *E03C 1/057* (2013.01); *G01S 13/04* (2013.01)

(58) Field of Classification Search
None
See application file for complete search history.

(56) References Cited

U.S. PATENT DOCUMENTS

| | | | |
|---|---|---|---|
| 6,250,601 B1 * | 6/2001 | Kolar ...................... G01S 7/41 251/129.04 |
| 7,278,624 B2 * | 10/2007 | Iott ......................... E03C 1/057 251/129.04 |
| 9,057,183 B2 | 7/2015 | Chen |
| 2007/0246550 A1 * | 10/2007 | Rodenbeck ........ G05D 23/1393 236/12.11 |
| 2013/0200097 A1 * | 8/2013 | Yang ...................... H05K 13/00 222/52 |
| 2014/0246099 A1 * | 9/2014 | Herbert ................... F03B 13/00 137/560 |
| 2018/0371729 A1 * | 12/2018 | Sugino ................. G01S 13/341 |

FOREIGN PATENT DOCUMENTS

WO    WO-2016048659 A2 *    3/2016    ............... B81B 7/00

* cited by examiner

*Primary Examiner* — Vladimir Magloire
*Assistant Examiner* — David C. Schultz
(74) *Attorney, Agent, or Firm* — MUNCY, GEISSLER, OLDS & LOWE, P.C.

(57) ABSTRACT

A sensor faucet includes a control assembly, a proximity sensor and a processing unit. The proximity sensor is configured to radiate a radio wave, receive a reflected radio wave, and output a sensing signal according to the reflected radio wave. The processing unit is electrically connected to the proximity sensor and a solenoid valve, and is configured to output a control signal according to the sensing signal. The sensor faucet is configured to perform: determining whether a voltage in response to the reflected radio wave in a second continuous number satisfies a predetermined condition when a first continuous number of the reflected radio wave exceeds a first threshold, operating the solenoid valve if the predetermined condition is not satisfied, continuously determining whether the second continuous number of the reflected radio wave exceeds a second threshold, and determining to output a sleep signal or a second control signal.

18 Claims, 6 Drawing Sheets

SENSOR FAUCET

FIELD OF THE INVENTION

The present invention relates to a sensor faucet, and in particular to the water outlet control of a sensor faucet.

BACKGROUND OF THE INVENTION

Faucet as a common cleaning device in daily life is always arranged in toilets, bathrooms, kitchens and the like. To prevent different users from touching the same switch, for example, U.S. Pat. No. 9,057,183 B2 discloses a TOUCH FREE AUTOMATIC FAUCET; and for such faucets, the proximity sensors are generally utilized to sense the approach of hands, and then the electromagnetic valves are opened to allow the faucets to discharge water, thereby avoiding the risk of indirect contact infection between people due to contact with the same hand-washing faucet.

The touch free automatic faucet has been widely used in public places, but when the faucet is used in public places, the environmental spaces and users are in an open state, so many external factors, such as foreign object invasion and false sensing of nearby hand-washing personnel, will lead to the problem that the touch free automatic faucet may discharge water due to accidental activation; and especially in the case of foreign object invasion, the touch free automatic faucet will continuously discharge water, to waste a large number of water resources.

It is also known that the water discharging conditions of the touch free automatic faucet such as flow rate and pressure are fixed, so the application elasticity is limited.

SUMMARY OF THE INVENTION

A purpose of the present invention is to solve the problem of waste water by accidental activation of the sensor faucet, while providing different water discharging modes.

To achieve the above purpose, in one embodiment of the present invention, the present invention provides a sensor faucet, which includes a base, a mixing valve, a control assembly, a proximity sensor and a processing unit, wherein the base extends vertically to define an inner space, the mixing valve is arranged in the inner space and connected with a cold source and a hot source to supply a combined fluid flowing into the control assembly, and the mixing valve is operatively coupled to a handle, which can be used to adjust the cold source and the hot source entering the mixing valve, thereby changing the water temperature of the combined fluid.

The control assembly is connected to an external power, which can be a battery pack or a mains supply. The control assembly includes an inlet conduit, an outlet conduit and a solenoid valve, wherein the inlet conduit is connected to an output end of the mixing valve to receive the combined fluid; the outlet conduit is connected to a spout to supply the combined fluid; the solenoid valve is arranged between the inlet conduit and the outlet conduit; the solenoid valve has an open position and a closed position; and at the open position, the solenoid valve allows the combined fluid to flow through, so that the combined fluid can enter the outlet conduit from the inlet conduit through the solenoid valve.

The proximity sensor is electrically connected to the solenoid valve, to control the solenoid valve to be operated between the open position and the closed position. The proximity sensor can be fixed on an outer wall surface of the base, and can detect approaching objects (such as hands of users who want to use the sensor faucet). The sensing principle of the proximity sensor includes Infrared (IR) sensing, microwave sensing and the like. In one embodiment, the proximity sensor is configured to periodically radiate a radio wave, and receive a reflected radio wave reflected from an object, and output a sensing signal according to the reflected radio wave being received.

The processing unit is electrically connected to the proximity sensor and the solenoid valve, and is configured to output a control signal according to the sensing signal. The sensor faucet is configured to perform the following steps:

Performing a first counting of the reflected radio wave, and determining whether a first continuous number of the reflected radio wave exceeds a first threshold;

determining whether voltages in response to the reflected radio wave among the first continuous number satisfy a predetermined condition when the first number exceeds the first threshold;

outputting a first control signal by the processing unit to operate the solenoid valve if the predetermined condition is not satisfied;

performing a second counting of the reflected radio wave after a specified time interval, and determining whether a second continuous number of the reflected radio wave exceeds a second threshold; and outputting a second control signal by the processing unit when the second continuous number exceeds the second threshold.

In conclusion, the present invention provides multiple functions besides water discharge through a two-stage determinations of the reflected radio wave, and can change the operation mode of the sensor faucet to meet more user's requirements, thereby increasing the functionality and application of the sensor faucet, and providing the users with more functions without additional hardware. In addition, the sensor faucet also has a plurality of automatic water shutoff functions for avoiding water waste caused by unintentional activation of the sensor faucet.

To make the above characteristics and advantages of the present invention clearer and easier to understand, the present invention will be described in detail below by embodiments in combination with the accompanying drawings.

DETAILED DESCRIPTION OF THE PREFERRED EMBODIMENTS

The terms used herein are intended for only describing specific embodiments, rather than limiting the present invention. Unless the context otherwise indicates, the singular forms "a" and "the" used herein may also include plural forms. A flowchart is adopted herein to illustrate the steps to be performed according to the embodiments. It should be understood that the steps do not necessarily follow the order described herein accurately, and conversely, can also be performed in a reverse order or at the same time. Meanwhile, other steps can also be added to the processes, or one or more steps can be removed from the processes.

Figure 1:
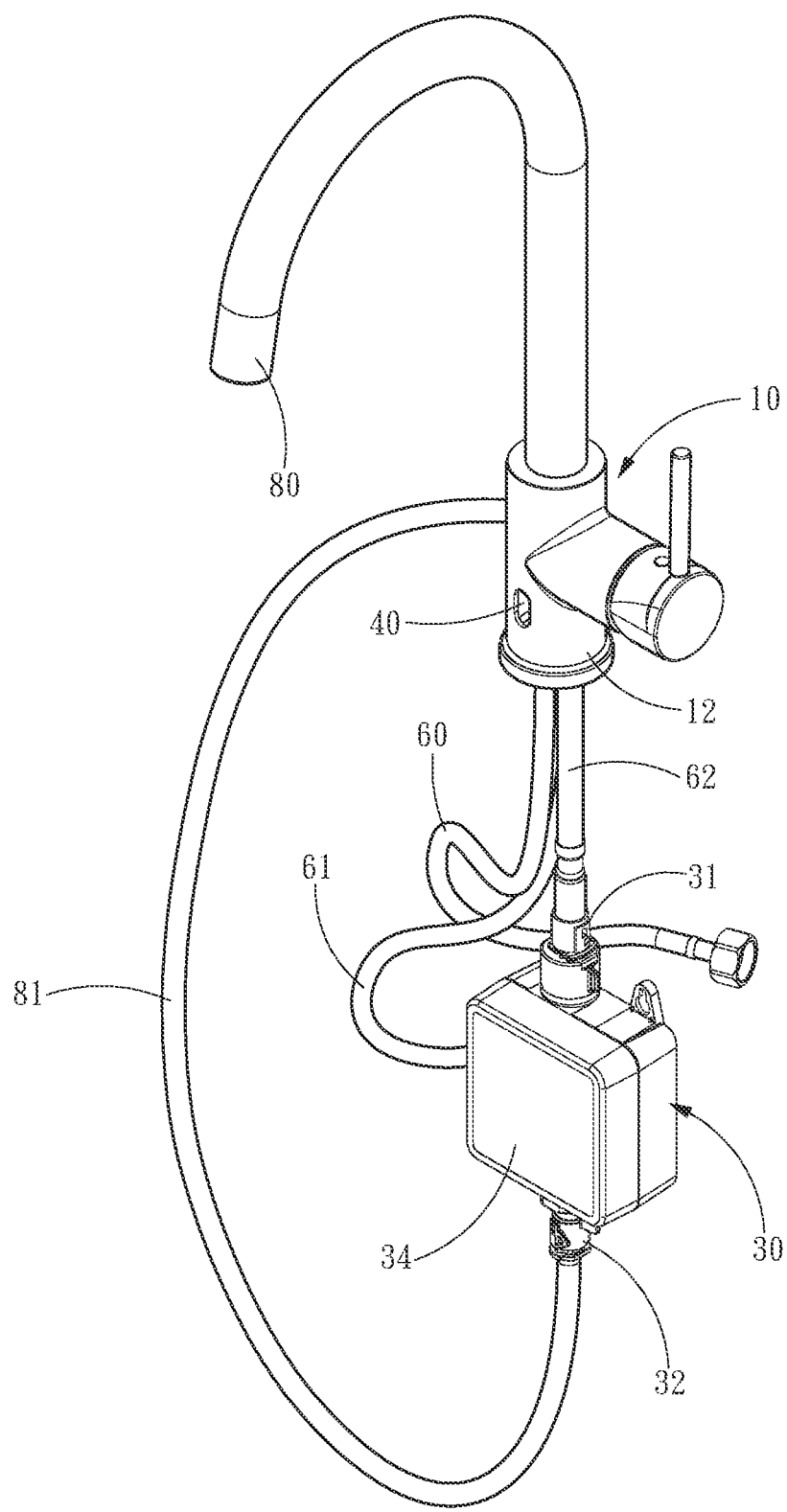
FIG. 1 is a perspective view of the sensor faucet according to an embodiment of the present invention.
Figure 2:
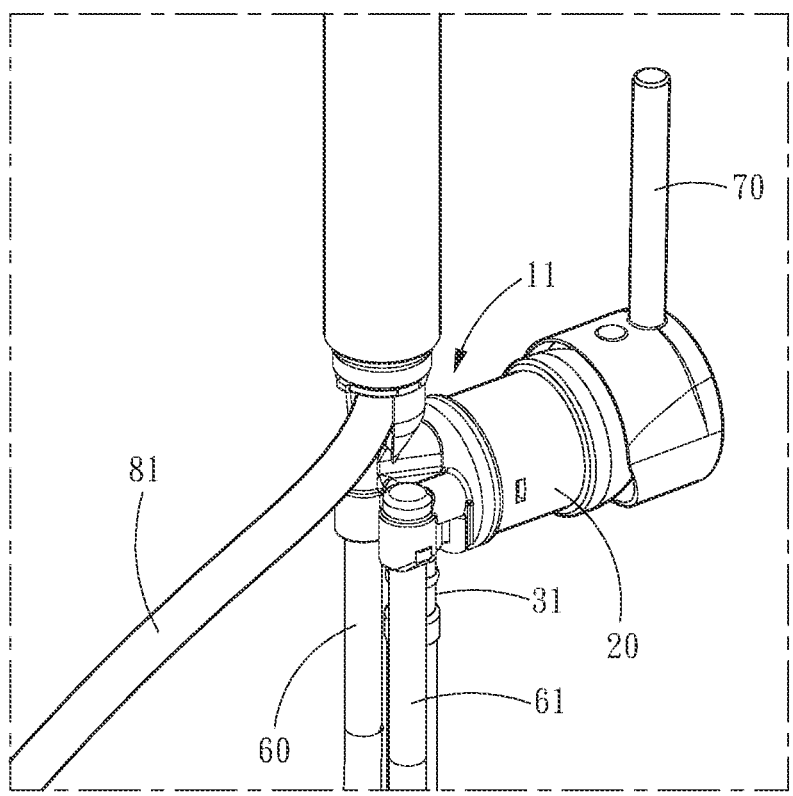
FIG. 2 is a perspective view of a part of the sensor faucet according to an embodiment of the present invention.
Figure 3:
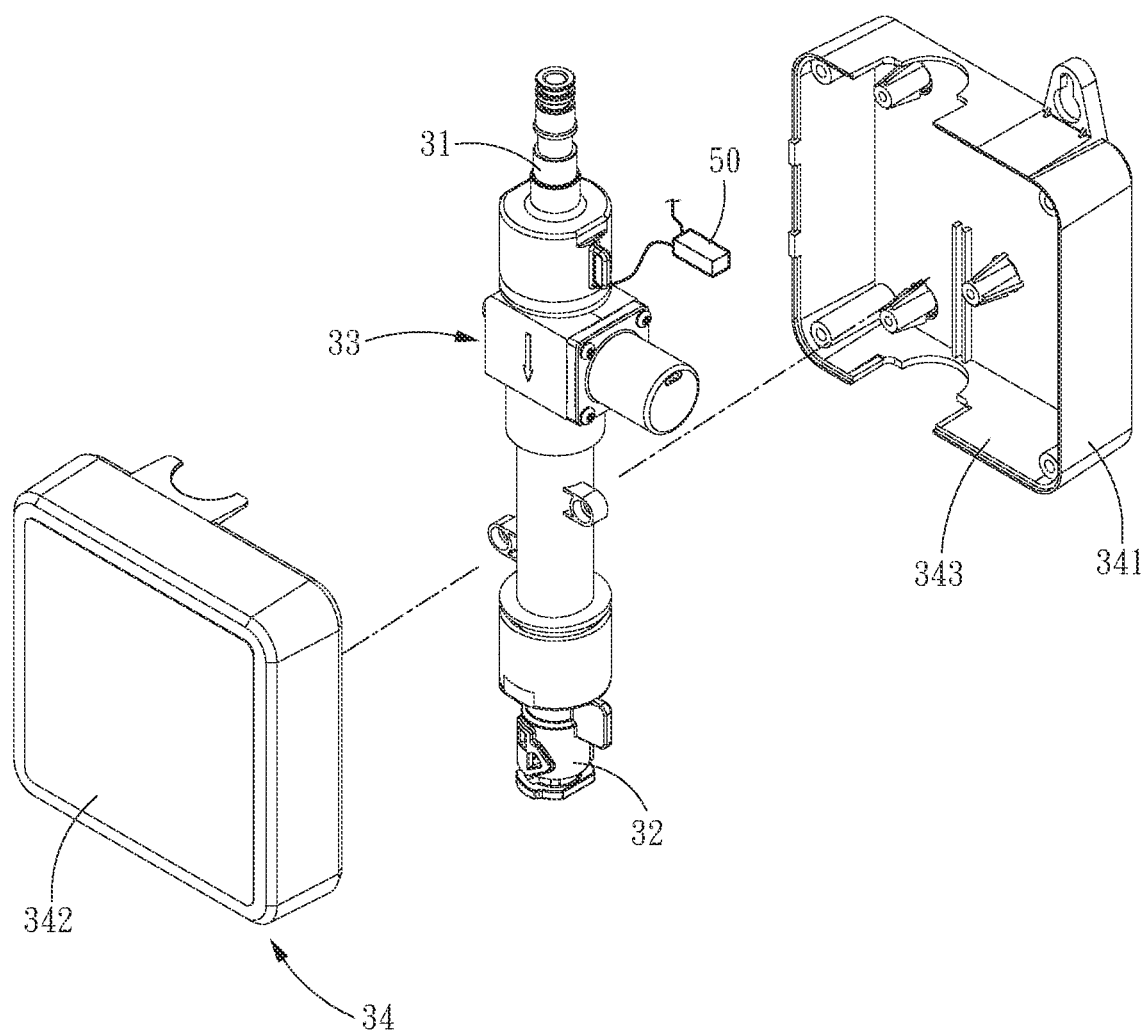
FIG. 3 is a perspective view of the control assembly of the sensor faucet according to an embodiment of the present invention.

Referring to FIG. 1, FIG. 2 and FIG. 3, the present invention discloses an sensor faucet, which includes a base 10, a mixing valve 20, a control assembly 30, a proximity sensor 40 and a cable 50. The base 10 extends vertically to define an inner space 11, the mixing valve 20 is disposed in the inner space 11. The mixing valve 20 connects to a cold source and a hot source through a cold water conduit 60 and a hot water conduit 61 respectively to receive cold water and hot water, thereby a combined fluid is supplied from a output conduit 62 and flowed into the control assembly 30. The mixing valve 20 is operably coupled to a handle 70, which can be swiveled to adjust flow of the cold water and the hot water entering the mixing valve 20 to change a water temperature of the combined fluid. The control assembly 30 is configured to control whether the combined fluid flows out.

A possible implementation structure of the control assembly 30 will be described below, but cannot be used for limiting the present invention. The control assembly 30 includes an inlet conduit 31, an outlet conduit 32, an solenoid valve 33 and a housing 34. The housing 34 includes a housing seat 341 and a housing cover 342. The housing seat 341 and the housing cover 342 form an accommodation space 343. The inlet conduit 31 is connected to an output end of the mixing valve 20 to receive the combined fluid. The outlet conduit 32 is connected to a spout 80 through a connecting conduit 81, and the combined fluid flows out from the spout 80. The solenoid valve 33 is disposed between the inlet conduit 31 and the outlet conduit 32, and is operated between an open position and a closed position. The combined fluid is blocked to flow into the inlet conduit 31 from the outlet conduit 32, when the solenoid valve 33 is at the closed position.

The combined fluid flows into the outlet conduit 32 from the inlet conduit 31, when the solenoid valve 33 is at the open position.

Figure 4:
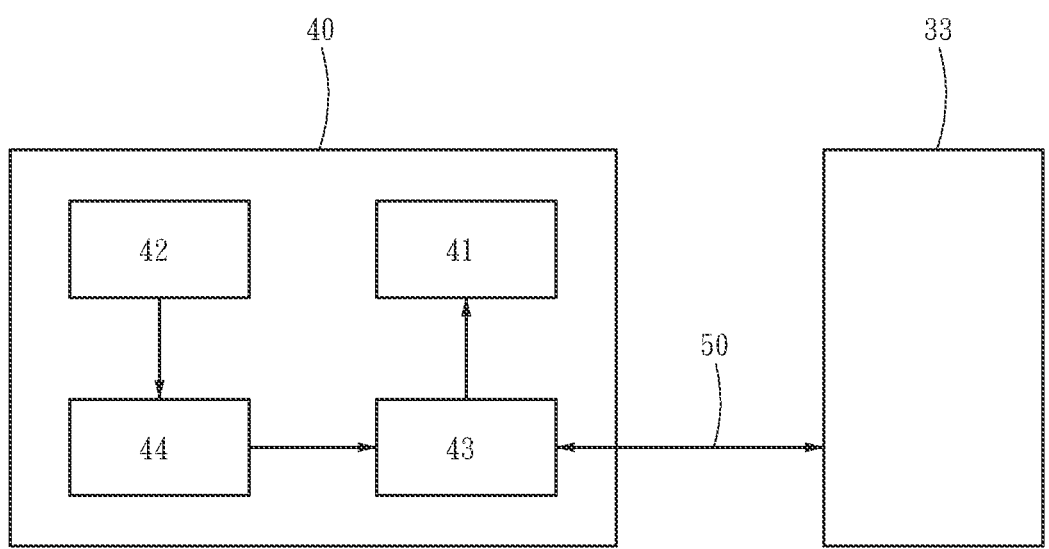
FIG. 4 is a block diagram illustrating a system configuration of an embodiment of the present invention.

The proximity sensor 40 is attached on an outer wall surface 12 of the base 10. Referring to FIG. 4, for example, if the proximity sensor 40 is an IR proximity sensor, the proximity sensor 40 includes a transmitter 41, a detector 42 and a processing unit 43 electrically connected with the transmitter 41 and the detector 42. The transmitter 41 is configured to periodically radiate radio waves and receive the reflected radio wave reflected from an object. The detector 42 detects an approaching object (such as hands or other parts of users who desires to activate the sensor faucet) according to the reflected radio wave. In an example, the processing unit 43 is a microcontroller, the proximity sensor 40 outputs a sensing signal according to the reflected radio wave being received. For example, in one embodiment, the transmitter 41 periodically radiates the radio waves. Each of the intervals of the radio waves may be consistent or varied between 2 ms and 5 ms, but the present invention is not limited thereto, the intervals of the radio waves may also be between 0.1 ms and 2 ms, or greater than 5 ms. During operation, a voltage will be generated when receiving the reflected radio wave. In one example, each of the voltages is a pulse voltage. The proximity sensor 40 also includes an amplifier 44 for amplifying the pulse voltage to facilitate detection and determination. In other examples, the amplifier 44 can also be integrated into the processing unit 43.

The proximity sensor 40 is connected with the solenoid valve 33 through a cable 50. The processing unit 43 is configured to output a control signal according to the sensing signal. The control signal may be a command for controlling the solenoid valve 33 to be opened or closed, and controlling the solenoid valve 33 to be operated between the open position and the closed position, and the control signal may also be a command for performing other functions.

Figure 5:
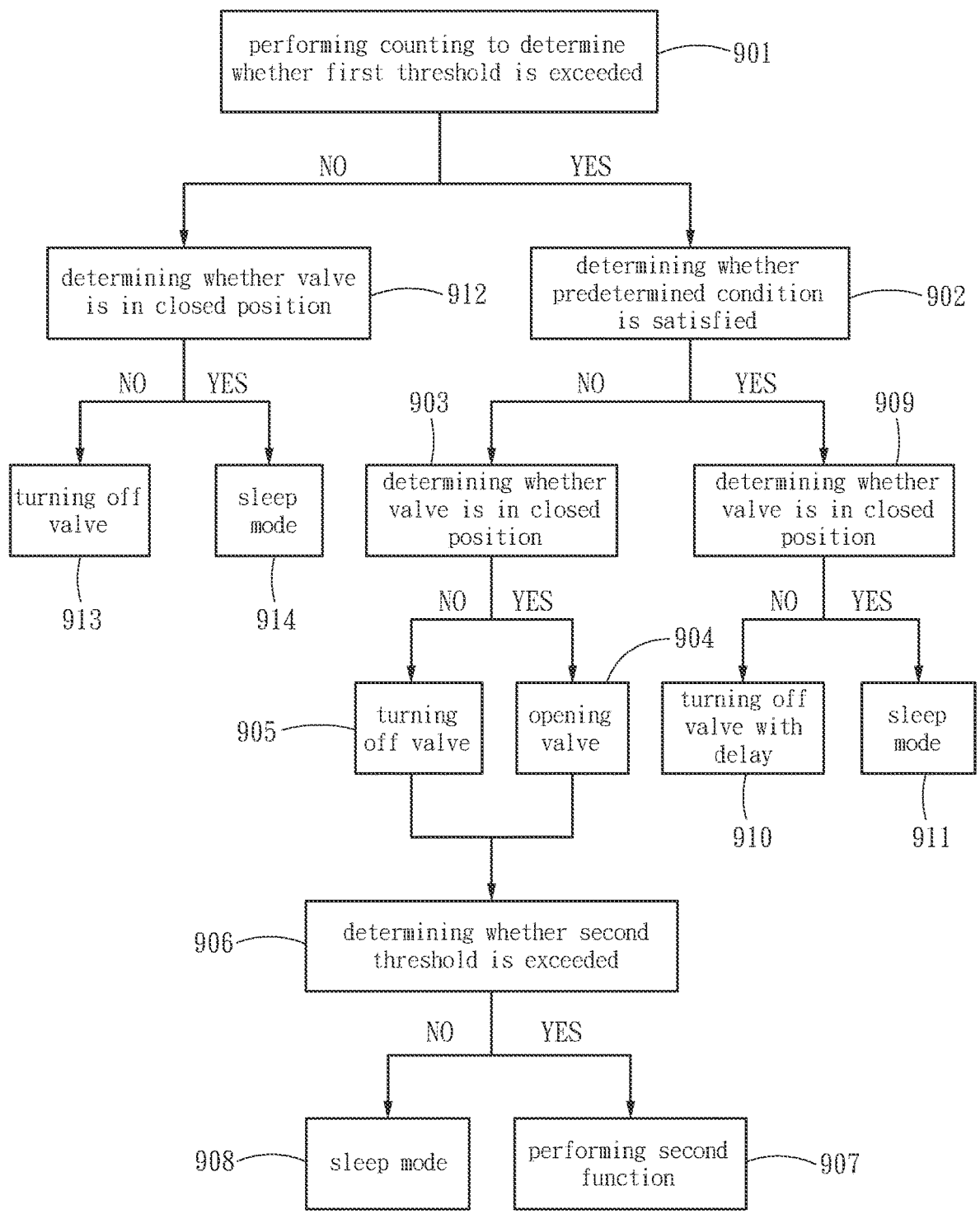
FIG. 5 is a schematic diagram of a flow chart according to an embodiment of the present invention.

Referring to FIG. 5, the sensor faucet is configured to perform the steps as follows.

In step 901, a first counting is performed to determine whether the first threshold is exceeded. A voltage will be outputted when receiving the reflected radio wave. In the present embodiment, each of the voltages is a pulse voltage with a level. The processing unit 43 performs the first counting of the reflected radio wave by counting the numbers of the pulse voltages, and determines whether a first continuous number of the reflected radio wave exceeds a first threshold. For example, the proximity sensor 40 is configured to periodically radiate the radio waves, wherein each of the intervals of radio waves is a fixed value between 2 ms and 5 ms, and each of the radio waves is a pulse signal with a pulse width of 30 μs. The processing unit 43 will detect the pulse voltage, and determine the first continuous number of the reflected radio wave according to a number of times of the pulse voltage. For example, if the first threshold is 6 and the number of times of the pulse voltage detected by the processing unit 43 is 8, the processing unit 43 determines that the first threshold is exceeded. If the first threshold is 6 and the number of times of the pulse voltage detected by the processing unit 43 is 5, the processing unit 43 determines that the first threshold is not exceeded. In one example, "continuous" of the first continuous number means that each reflected radio wave does not exceed a predetermined interval. For example, if the intervals of the radio waves are between 2 ms and 5 ms, the predetermined interval may be between 2 ms and 10 ms.

In step 902, determining whether a first predetermined condition is satisfied. When the first continuous number exceeds the first threshold, the processing unit 43 further determines whether a voltage value in response to the reflected radio wave in the first continuous number satisfy a first predetermined condition, and each of the voltage values is the level described in step 901. In one embodiment, the amplifier 44 can be used to amplify the level of the pulse voltage to facilitate detection and determination. The first predetermined condition is whether the voltage values in a group of reflected radio waves fall within a range, such as ±10% of a first predetermined voltage. If so, the first predetermined condition is satisfied, otherwise, the first predetermined condition is not satisfied. In some embodiments, the first predetermined condition may be whether a specific amount(or percentage) of the voltage values (such as more than 80%) in the group of radio waves fall within the range.

The meaning of determination of whether the predetermined condition is satisfied is that, if all or most of the voltage values fall within the range after determination, which means that the object in proximity to or approaching the proximity sensor 40 is a stationary object rather than the hands or other parts of the users, so it is an accidental activation, which can also be called a false trigger or an unintentional trigger. If the voltage values do not all fall within the range after determination, which means that the object in proximity to or approaching the proximity sensor 40 is a moving object, usually the hands or other parts of the users, so it is an intentional trigger.

If the voltage values do not satisfy the first predetermined condition, the proximity sensor 40 is subjected to intentional trigger. The processing unit 43 outputs a first control signal to control the solenoid valve 33 to be operated. In one example, the first control signal is a pulse signal with a pulse width of 25 ms. Before the solenoid valve 33 is operated, the processing unit 43 firstly determines whether the solenoid valve 33 is in the open position or the closed position (903). If the solenoid valve 33 is in the closed position at that time, the first control signal is a command for controlling the solenoid valve 33 to be operated from the closed position to the open position (904), thereby performing a water supply function (a first function), such as discharging water for a predetermined time. If the solenoid valve 33 is in the open position at that time, the first control signal is a command for controlling the solenoid valve 33 to be operated from the open position to the closed position (905), thereby performing a turn-off function (the first function) to stop discharging water.

After 904 or 905, the processing unit 43 performs a second counting of the reflected radio wave according to the pulse voltage, and determines whether a second continuous number of the reflected radio wave exceeds a second threshold (906). This step is similar to 901, and will not be repeated here. In one embodiment, a number of times of the first threshold and the second threshold are the same. In other embodiments, the number of times of the first threshold and the second threshold may be different.

If the processing unit 43 determines that the second continuous number of the reflected radio wave exceeds the second threshold according to the number of times of the pulse voltage, which means that the object (the hands or other parts of the users) keeping approaching and thus triggers the proximity sensor 40 after the first time trigger. The processing unit 43 outputs a second control signal at this time, wherein the second control signal is a command for controlling the sensor faucet to perform a second function (907). In the present invention, the second function may be an operation different from the first function (discharging water or turn-off after the predetermined time), such as changing the water discharging mode, entering long-time water discharging, increasing the water pressure and etc. The processing unit 43 returns to a sleep mode until the second function is finished. If the second continuous number does not exceed the second threshold, the processing unit 43 enters into the sleep mode (908). In the present embodiment, the processing unit 43 is operated in the sleep mode and a detection mode, and difference between the sleep mode and the detection mode is the intervals of the radio waves. When in the sleep mode, the interval of the radio waves is longer. For example, if the interval of the radio waves in the detection mode is 5 ms, the interval of the radio waves in the sleep mode is at least 256 ms, thereby saving power. If the reflected radio wave is received when the processing unit 43 is in the sleep mode, the processing unit 43 is then switched and operated in the detection mode. If the reflected radio wave is not received, the processing unit 43 remains to be in the sleep mode.

Returning to 902, if the first predetermined condition is satisfied, it is to be said the proximity sensor 40 is subjected to the unintentional trigger. The processing unit 43 further identifies the status of the solenoid valve 33 (909) at that time. If the solenoid valve 33 is at the open position, the processing unit 43 outputs a third control signal to avoid wasting water. The third control signal is a turn-off command (910) which controls the solenoid valve 33 to be operated from the open position to the closed position. In one embodiment, the solenoid valve 33 may be closed after a certain period after a determination result in step of 909 is obtained, i.e., delay turn-off, and the processing unit 43 returns to the sleep mode after the solenoid valve 33 is closed. If the solenoid valve 33 is already at the closed position, the third control signal outputted by the processing unit 43 is a sleep signal (911). In the present embodiment, when the solenoid valve 33 is closed, the sleep mode can save power consumption.

Returning to 901, if the first continuous number does not exceed the first threshold, it is neither an intentional trigger nor a unintentional trigger. The processing unit 43 determines whether the solenoid valve 33 is closed (912), if the solenoid valve 33 is in the open position, the processing unit 43 will output a shutoff protection signal to control the solenoid valve 33 to be operated from the open position to the closed position (913) to turn off the solenoid valve 33, and the processing unit 43 will return to the sleep mode after the solenoid valve 33 is closed. If the solenoid valve 33 is at the closed position, the processing unit 43 returns to the sleep mode (914).

Figure 6:
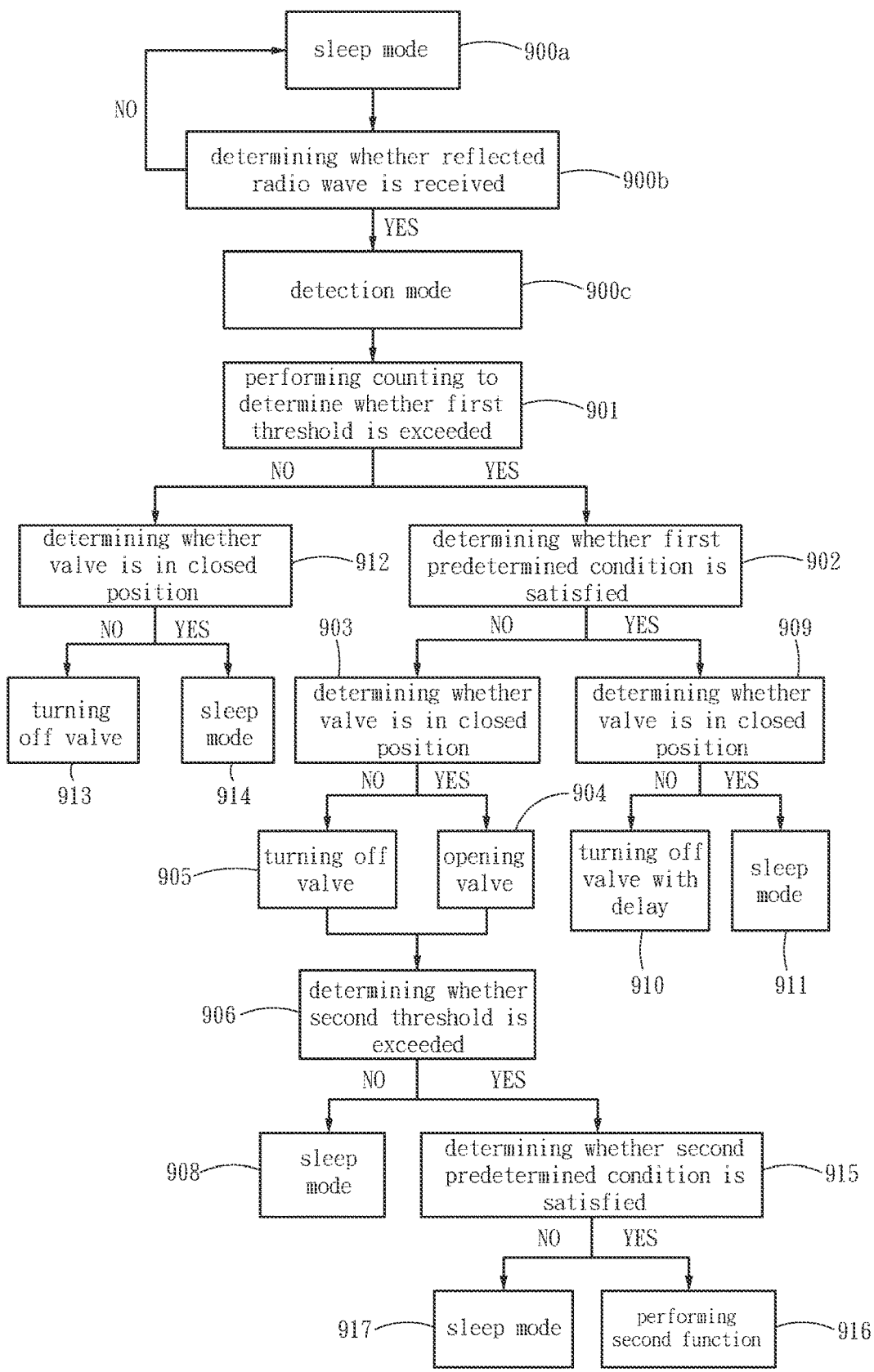
FIG. 6 is a schematic diagram of a flow chart according to another embodiment of the present invention.

Referring to FIG. 6, which is a schematic diagram of the operation flow according to another embodiment of the present invention. The processing unit 43 is normally in the sleep mode (900a), and controls the proximity sensor 40 to radiate the radio waves for a long period. In the sleep mode, the proximity sensor 40 will determine whether the reflected radio wave is received (900b), and when the proximity sensor 40 receives at least one reflected radio wave, the processing unit 43 starts to operate in the detection mode. In the detection mode, the processing unit 43 controls the proximity sensor 40 to radiate the radio waves for a short period (900c), to increase a detection accuracy and a function performing speed. On the contrary, when the proximity sensor 40 does not receive the reflected radio wave, the processing unit 43 is maintained in the sleep mode, and the processing unit 43 controls the proximity sensor 40 to continue to radiate the radio waves for the long period to save power.

When the proximity sensor 40 receives the reflected radio wave, the processing unit 43 is operated in the detection mode to control the proximity sensor 40 to radiate the radio wave for the short period (900c). Then 901 is returned, and the subsequent steps are described as above.

In the present embodiment, after 906, when it is determined that the second continuous number of the reflected radio waves exceeds the second threshold, the processing unit 43 further determines whether the voltage value in response to the reflected radio wave in the second continuous number satisfy a second predetermined condition (915). In one embodiment, the second predetermined condition is the same as the first predetermined condition. When the second predetermined condition is satisfied, the processing unit 43 outputs the second control signal to control the sensor faucet to perform the second function (916). When the second predetermined condition is not satisfied, the processing unit returns to the sleep mode (917).

In conclusion, the present invention provides additional functions besides water discharge through a two-stage determinations of the reflected radio wave, and can change the operation mode of the sensor faucet to satisfy more requirements, thereby increasing the functionality and application of the sensor faucet, and providing the users with more functions without additional hardware. In addition, the sensor faucet also has a plurality of automatic water shutoff functions for avoiding water waste caused by unintentional activation of the sensor faucet.

What is claimed is:

1. A sensor faucet, comprising:
a base, extending vertically to define an inner space;
a mixing valve, disposed in the inner space and connected to a cold source and a hot source to supply a combined fluid, wherein the mixing valve is operably coupled to a handle;
a control assembly, comprising an inlet conduit, an outlet conduit and a solenoid valve arranged between the inlet conduit and outlet conduit, wherein the inlet conduit is connected to an output end of the mixing valve, and the outlet conduit is connected to a spout; and
a proximity sensor, configured to periodically radiate radio waves and receive a reflected radio wave reflected from an object, wherein the proximity sensor controls the solenoid valve to be operated between an open position and a closed position according to the reflected radio waves being received;
wherein the sensor faucet is configured to perform the following steps:
performing a first counting of the reflected radio wave, and determining whether a first continuous number of the reflected radio wave exceeds a first threshold;
determining whether voltages in response to the reflected radio wave among the first continuous number satisfy a predetermined condition when the first continuous number exceeds the first threshold;
outputting a first control signal by a processing unit of the proximity sensor to perform a first function if the predetermined condition is not satisfied, wherein when the first function is performed, the solenoid valve is operated to switch between the open position and the closed position;
performing a second counting of the reflected radio wave, and determining whether a second continuous number of the reflected radio wave exceeds a second threshold; and
outputting a second control signal by the processing unit to perform a second function when the second continuous number exceeds the second threshold, wherein when the second function is performed, a water discharging mode of the sensor faucet is changed.

2. The sensor faucet according to claim 1, wherein the predetermined condition is whether the voltages fall within a range.

3. The sensor faucet according to claim 1, wherein the voltages are a level of a pulse voltage triggered by the reflected radio wave.

4. The sensor faucet according to claim 3, wherein the level is amplified by an amplifier and then sampled by the processing unit.

5. The sensor faucet according to claim 1, wherein if the first continuous number does not exceed the first threshold and the solenoid valve is at the open position, the processing unit controls the solenoid valve to be operated from the open position to the closed position.

6. The sensor faucet according to claim 1, wherein if the first continuous number does not exceed the first threshold and the solenoid valve is at the closed position, the processing unit is operated in a sleep mode.

7. The sensor faucet according to claim 1, wherein if the voltages satisfy the predetermined condition and the solenoid valve is at the open position, the processing unit controls the solenoid valve to be operated from the open position to the closed position; and if the solenoid valve is at the closed position, the processing unit is operated in a sleep mode.

8. The sensor faucet according to claim 1, wherein if the second continuous number does not exceed the second threshold, the processing unit is operated in a sleep mode.

9. The sensor faucet according to claim 1, wherein the processing unit is operated in a sleep mode and a detection mode, the proximity sensor radiates the radio waves at a first interval when in the sleep mode, and radiates the radio waves at a second interval when in the detection mode; and the first interval is longer than the second interval.

10. A sensor faucet, comprising:
a base, extending vertically to define an inner space;
a mixing valve, disposed in the inner space and connected to a cold source and a hot source to output a combined fluid, wherein the mixing valve is operably coupled to a handle;
a control assembly, comprising an inlet conduit, an outlet conduit and a solenoid valve arranged between the inlet conduit and outlet conduit, wherein the inlet conduit is connected to an output end of the mixing valve, and the outlet conduit is connected to a spout; and
a proximity sensor, configured to periodically radiate a radio wave, and receive a reflected radio wave reflected from an object, wherein the proximity sensor controls the solenoid valve to be operated between an open position and a closed position according to the reflected radio wave being received;
wherein the sensor faucet is configured to perform the following steps:
performing a first counting of the reflected radio wave, and determining whether a first continuous number of the reflected radio wave exceeds a first threshold;
determining whether voltages in response to the reflected radio wave in the first continuous number satisfy a predetermined condition when the first continuous number exceeds the first threshold;
outputting a first control signal by a processing unit of the proximity sensor to perform a first function if a first predetermined condition is not satisfied, wherein when the first function is performed, the solenoid valve is operated to switch between the open position and the closed position;
performing a second counting of the reflected radio wave, and determining whether a second continuous number of the reflected radio wave exceeds a second threshold;
determining whether the voltages in response to the reflected radio wave in the second continuous number satisfy a second predetermined condition when the second continuous number exceeds the second threshold; and
outputting a second control signal by the processing unit to control the sensor faucet to perform a second function if the second predetermined condition is not satisfied, wherein when the second function is performed, a water discharging mode of the sensor faucet is changed.

11. The sensor faucet according to claim 10, wherein the first predetermined condition or the second predetermined condition is whether the voltages fall within a range.

12. The sensor faucet according to claim 10, wherein the voltages are a level of a pulse voltage triggered by the reflected radio wave.

13. The sensor faucet according to claim 12, wherein the level is amplified by an amplifier and then sampled by the processing unit.

14. The sensor faucet according to claim 10, wherein if the first continuous number does not exceed the first threshold and the solenoid valve is at the open position, the processing unit controls the solenoid valve to be operated from the open position to the closed position.

15. The sensor faucet according to claim 10, wherein if the first continuous number does not exceed the first threshold and the solenoid valve is at the closed position, the processing unit is operated in a sleep mode.

16. The sensor faucet according to claim 10, wherein if the predetermined condition is satisfied and the solenoid valve is at the open position, the processing unit controls the solenoid valve to be operated from the open position to the closed position; and if the solenoid valve is at the closed position, the processing unit is operated in a sleep mode.

17. The sensor faucet according to claim 10, wherein if the second continuous number does not exceed the second threshold, the processing unit is operated in a sleep mode.

18. The sensor faucet according to claim 10, wherein the processing unit is operated in a sleep mode and a detection mode; the proximity sensor radiates the radio waves at a first interval when in the sleep mode, and radiates the radio waves at a second interval when in the detection mode; and the first interval is longer than the second interval.

\* \* \* \* \*